(12) United States Patent
Laskis et al.

(10) Patent No.: US 10,676,287 B2
(45) Date of Patent: Jun. 9, 2020

(54) CASE TURNER (71) Applicant: ILLINOIS TOOL WORKS INC., Glenview, IL (US)

(72) Inventors: Jon Paul Laskis, Simpsonville, SC (US); Robert C. Beesley, Greenville, SC (US); Joshua Riddle, Lyman, SC (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/294,622

(22) Filed: Mar. 6, 2019

(65) Prior Publication Data

US 2019/0276245 A1 Sep. 12, 2019

Related U.S. Application Data (60) Provisional application No. 62/639,067, filed on Mar. 6, 2018.

(51) Int. Cl.
*B65G 47/244* (2006.01)

(52) U.S. Cl.
CPC ...... *B65G 47/244* (2013.01); *B65G 2201/025* (2013.01); *B65G 2811/0626* (2013.01)

(58) Field of Classification Search
CPC ............ B65G 47/244; B65G 2201/025; B65G 2811/0626
See application file for complete search history.

(56) References Cited

U.S. PATENT DOCUMENTS

| 5,458,226 | A  | * | 10/1995 | Nakao ................. | B65G 47/244 198/346.2 |
| 7,364,029 | B2 | * | 4/2008 | Seidel ................. | B65G 47/244 198/376 |
| 7,931,137 | B2 |   | 4/2011 | Wargo | |
| 10,106,341 | B2 | * | 10/2018 | Arriaran Ugarte .. | B65G 47/086 |
| 2011/0017570 | A1 | * | 1/2011 | Graf ..................... | B65G 47/086 198/374 |
| 2013/0037382 | A1 | * | 2/2013 | Murano ............... | B65G 47/244 198/379 |

* cited by examiner

*Primary Examiner* — Gene O Crawford
*Assistant Examiner* — Keith R Campbell
(74) *Attorney, Agent, or Firm* — Pauley Erickson & Kottis (57) ABSTRACT

An apparatus for transporting a case along a conveyor moving in a transport direction includes an engagement plate for positive engagement with the case. The engagement plate has a planar face and a vacuum source for vacuum attachment to a case outer surface face. The apparatus further includes a mechanism for moving the plate in the transport direction and for rotating the plate a selected angle from the transport direction. Related, corresponding, or associated methods for transporting a case along a conveyor moving in a transport direction are also disclosed.

20 Claims, 6 Drawing Sheets

CASE TURNER

CROSS-REFERENCE TO RELATED APPLICATIONS

This application claims priority to U.S. Provisional Application, Ser. No. 62/639,067, filed 6 Mar. 2018. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to case packing and processing and, more particularly, to an apparatus and method for turning a case or carton.

Description of Prior Art

Cases or cartons, such as in the shape or form of cardboard boxes, for example, are commonly used or employed for or in the packaging and transport of products and articles. Devices and apparatus commonly used in the making and the subsequent movement of such cases often include a case erector such as may include an integrated turner.

Most current case turners use a bump turn style mechanism to rotate the box 90 degrees before or after packing. Such a method requires a convey to transport a box into a protrusion that extends a short distance past the front box corner causing the forward movement of the box to hesitate while the rear end of the box pivots around 90 degrees. This is caused by the friction between the case and conveyor when the front corner is prevented from moving forward. U.S. Pat. No. 7,931,137 is an example of such a type of case turner.

Another type of case turner uses two conveyor belts that run side by side where one belt is run at a faster speed than the other belt to create a differential that causes the box to rotate to a desired orientation. Yet again this method requires or relies on friction between the case and conveyors to cause the case to rotate.

Another known case rotating method involves the use of a star wheel mechanism which requires a powered paddle system that pivots with the box to rotate it 90 degrees. Such a system works by conveying a case into a "+" shaped powered paddle that squares the box on two sides and rotates the box 90 degrees while the conveyor runs underneath it. With such a device or mechanism, the paddle must push the box to overcome the friction between the box and conveyor but preferably avoids pushing the box too much so as to avoid causing the box to over rotate beyond the desired 90 degrees from original orientation.

While the above-discussed methods for rotating cases are generally effective for effecting a rotation of an acted-upon case, these methods typically require or involve a large area or long conveyor to accomplish the task of rotating the case. This is can be particularly undesirable in manufacturing and/or production locales where space may be at a premium or where free or otherwise uncommitted space is generally unavailable. Further, these methods rely on friction between the case or box and the conveyor to rotate the case. The friction, however, can vary depending on the environment where the packaging machine is installed. Thus, friction is often considered unreliable due to the varying factors that can affect it. Moreover, these systems often can experience jams which cause the processing machine to either stop or damage the product. Both such scenarios can cost the manufacturers valuable time and/or money.

An alternative system that does not rely on the use of friction or conveyors has been developed. Such a system relies on vacuum suction cups to hold the inside of the box or case during rotation. More specifically, the tooling utilizes a vacuum head that is inserted into the box and lifts the case up prior to placement of the case on the conveyor in a desired orientation. While such a system can greatly enhance the reliability of case transport and rotation, such a system presents its own set of challenges. For example, the change in tooling required by such a system is extremely bulky and requires changes for each box configuration. As will be appreciated, such factors can be highly undesirable as storage space is scarce in most facilities.

SUMMARY OF THE INVENTION

The present invention is directed to case turners such as may be used to rotate a case, carton, box or the like 90 degrees before or after packing as well as to related methods.

In accordance with one aspect of the subject development, there is provided an apparatus for transporting a case along a conveyor that moves in a transport direction. In accordance with one embodiment, such an apparatus includes an engagement plate for positive engagement with the case. The engagement plate has a planar face and there is a vacuum source for vacuum attachment of the plate to a case outer surface face. The apparatus further includes a mechanism for moving the plate in the transport direction and for rotating the plate a selected angle from the transport direction.

In some preferred embodiments, the mechanism for moving the plate in the transport direction and for rotating the plate desirably serves to rotate the plate for an angle between 0 degrees and 120 degrees from the transport direction.

In certain preferred embodiments, the mechanism for moving the plate in the transport direction and for rotating the plate desirably serves to rotate the plate for an angle of about 90 degrees from the transport direction.

In accordance with another embodiment, there is provided a case transport apparatus such as for sequentially individually transporting a case along a conveyor moving in a transport direction from a stream of cases in a sequential process. In accordance with one embodiment, such an apparatus includes an engagement plate for positive engagement with the case. The engagement plate includes a planar face and a vacuum source for vacuum attachment to an outer lateral surface face of the case. The engagement plate has a plurality of vacuum suction cups disposed in spaced relation on the planar face to engage with the outer lateral surface face of the case. The apparatus further includes a mechanism for moving the plate in the transport direction and for rotating the plate an angle of between 0 degrees and 120 degrees from the transport direction.

In accordance with another aspect of the subject development, a method for transporting a case along a conveyor moving in a transport direction is provided. In one embodiment, such a method involves attaching, via application of a vacuum, an engagement plate with a case outer surface face to form a case/plate combination. The method further involves moving the combination in the transport direction and, subsequently, detaching the engagement plate from the case to allow the case to be separately conveyed.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
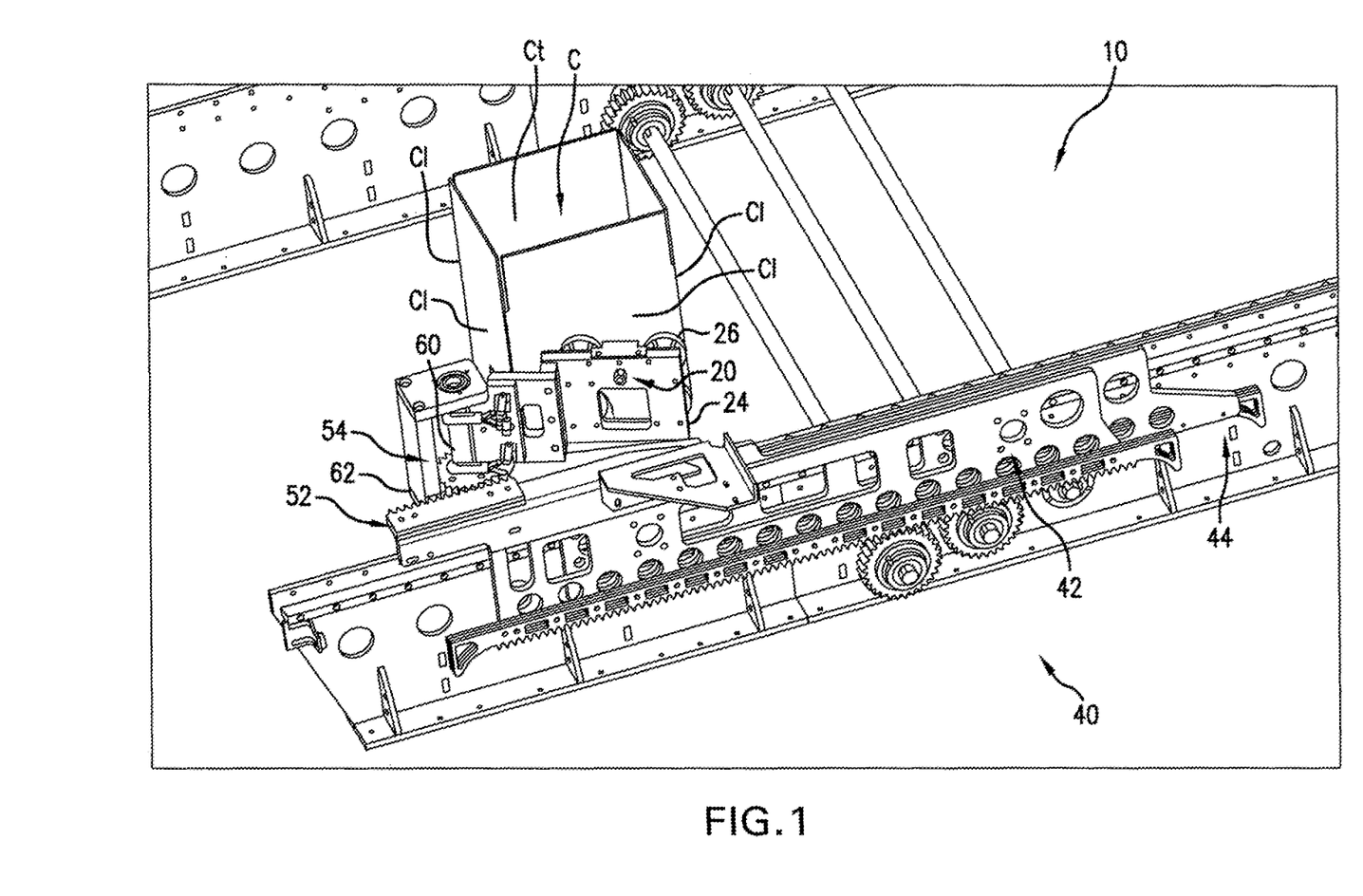
FIG. 1 is a schematic perspective view of an apparatus in the transport of an exemplary case according to one preferred embodiment of the invention.
Figure 2:
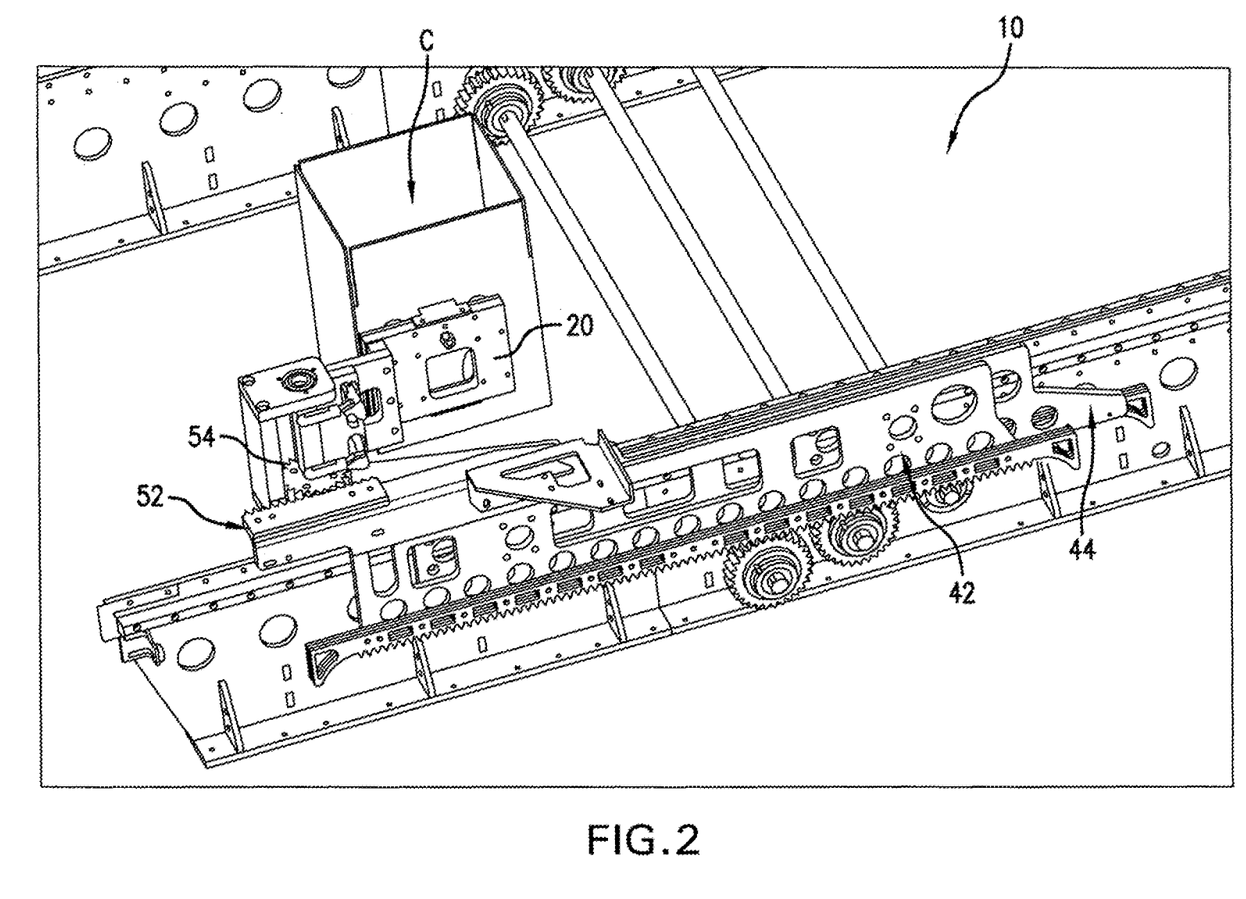
FIG. 2 is a schematic perspective view of the apparatus shown in FIG. 1 but now showing the case transport at a subsequent point in the transport process.
Figure 3:
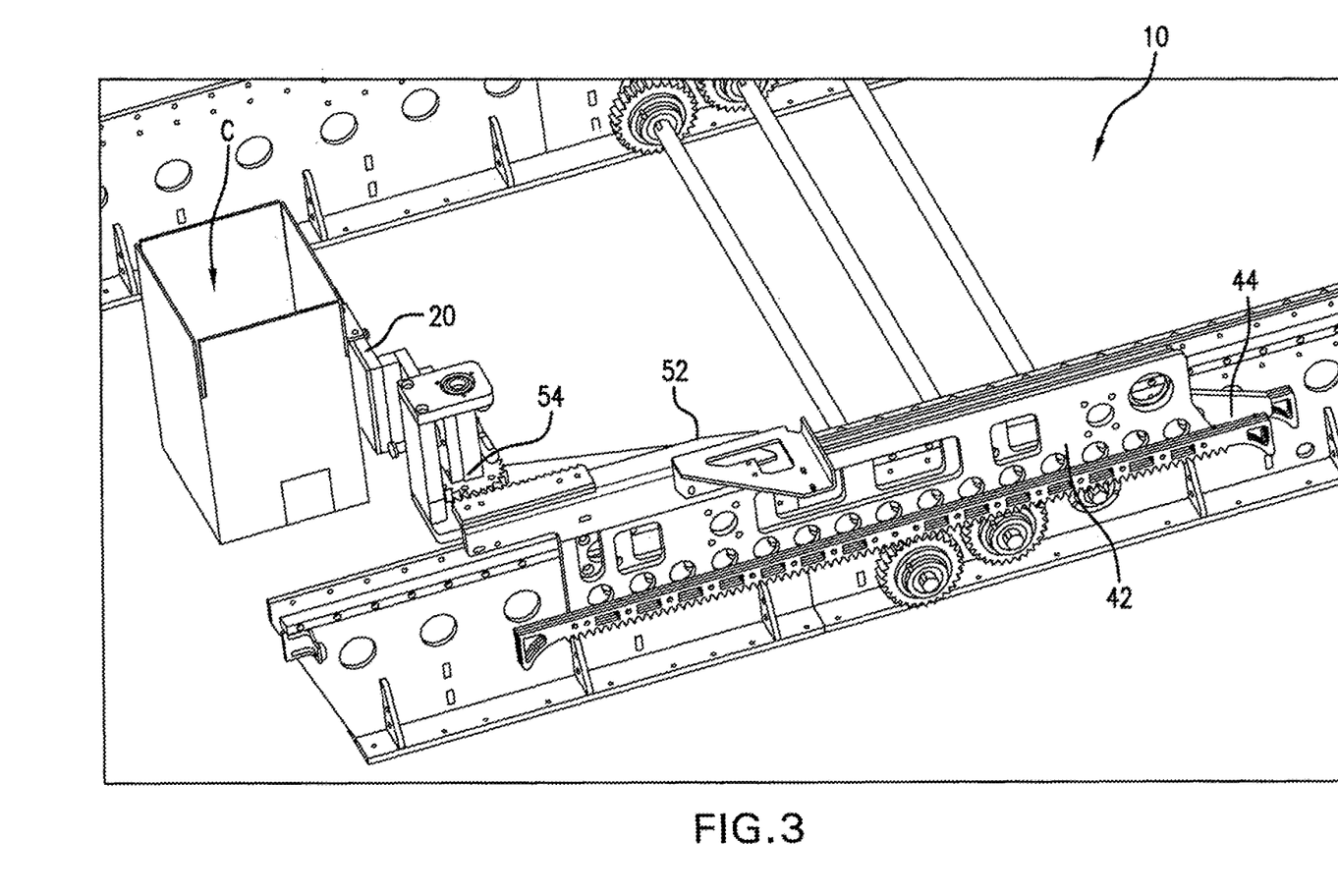
FIG. 3 is a schematic perspective view of the apparatus shown in FIG. 1 and FIG. 2 but now showing the case transport at a further subsequent point in the transport process.

FIGS. 1, 2, and 3 show an apparatus, generally designated by the reference numeral 10 and in accordance with one preferred embodiment of the invention in the practice of a first aspect of the invention. More particularly, these figures illustrate the apparatus 10 while in the process of transporting a case C in a manner wherein the case C is rotated a selected angle from the transport direction. In the illustrated embodiment, the case C has four side or lateral outer surface faces Cl as well as an open top Ct and a bottom surface face (not shown).

In this specific example, the case C is rotated approximately 90 degrees from the transport direction. It is to be understood, however, another selected angle of rotation such as between 0 degrees and 120 degrees can, as may be desired, be appropriately employed or utilized should such an angle of rotation be desired or required for a particular application.

The apparatus 10 includes an engagement plate 20 for positive engagement with the case C. The engagement plate 20 has a generally planar face 24 that includes a plurality of vacuum suction cups 26 for positive engagement with the case C. As shown, the engagement plate 20 desirably vacuum attaches to or with a case outer surface face, particularly a case outer surface side or lateral face C1, rather than a top or bottom face.

Figure 4:
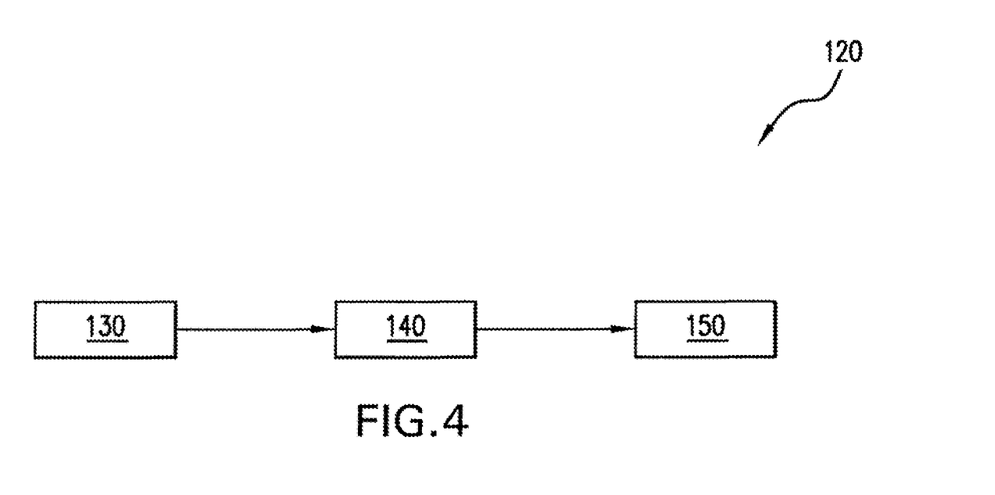
FIG. 4 is a simplified schematic representing application of an apparatus in accordance with the invention in the transport of a case or box.

Turning to FIG. 4 there is illustrated a simplified schematic 120 representing the application of an apparatus in accordance with the invention in the transport of a case or box. As shown, a vacuum source, such as designated 130, is joined, connected or a part of apparatus 140 shown as acting on a case 150. In accordance with a specific embodiment, the vacuum source 130 is desirably in vacuum producing communication with the apparatus 140 engagement plate and the suction cups.

Returning to FIGS. 1-3, the apparatus 10 further includes a mechanism, generally designated by the reference numeral 40 for moving the plate in the transport direction and for rotating the plate at least 90 degrees. To that end, the mechanism 40 includes dual rack and pinion systems 42 and 44. As detailed herein, the systems 42 and 44 work together such as to pivot the engagement plate 20 and the vacuum suctions cups 26 disposed thereon a desired angle, such as from or between 0 degrees to 120 degrees, based on the differential between the two systems.

The system 42 has a secondary rack 52 perpendicularly attached at the top of the system 42 that engages with the system 44 secondary pinion 54. A square shaft 60 passes through a square hole 62 concentric to this pinon gear 54. This shaft 60 serves to rotate the engagement plate 20 and the vacuum suctions cups 26 disposed thereon an angle, as desired, when the position of the system 42 changes relative to the system 44.

More specifically, FIG. 1 shows the apparatus 10 at a pick up position (e.g., prior to rotating) for a turned case application. FIG. 2 further highlights the engagement by the engagement plate 20 with the case C lateral side Cl. FIG. 3 illustrates the engagement plate 20 attached to the case C lateral side Cl now rotated a desired angle, in this instance a rotation of approximately 90 degrees.

The reliability of the apparatus for or in rotating a box or case is greatly enhanced due to the positive control provided or resulting from the application of the vacuum suction cups onto case. The suction cups desirably prevent the case from moving out of position and force the case to only the desired orientation. In practice, the cups desirably remain in contact with the box until the box reaches a hand off point where, for example, the box can be appropriately positively engaged by a following or successive machine or component, such as by grips of or from such following or successive machine or component, making for a fully controlled hand off. After such successive positive engagement, the vacuum suctions cups can be appropriately detached and moved or retracted out of the way of further transport of the case. For example, the vacuum to the suctions cups can be discontinued or a positive air force could be communicated to the suction cups such that the suction cups blow off such that they no longer positively engage with the case side wall.

While the invention has been described above making specific reference to an embodiment wherein an apparatus in accordance with the subject development is used to effect a desired turning or rotation of the case or box being processed or acted upon, those skilled in the art and guided by the teaching herein provided will understand and appreciate that the broader practice of the invention is not necessarily so limited. For example, the apparatus of the subject development can, if desired, be used or applied so as to transport a case or box in the transport direction without necessarily turning or rotating the box.

Figure 5:
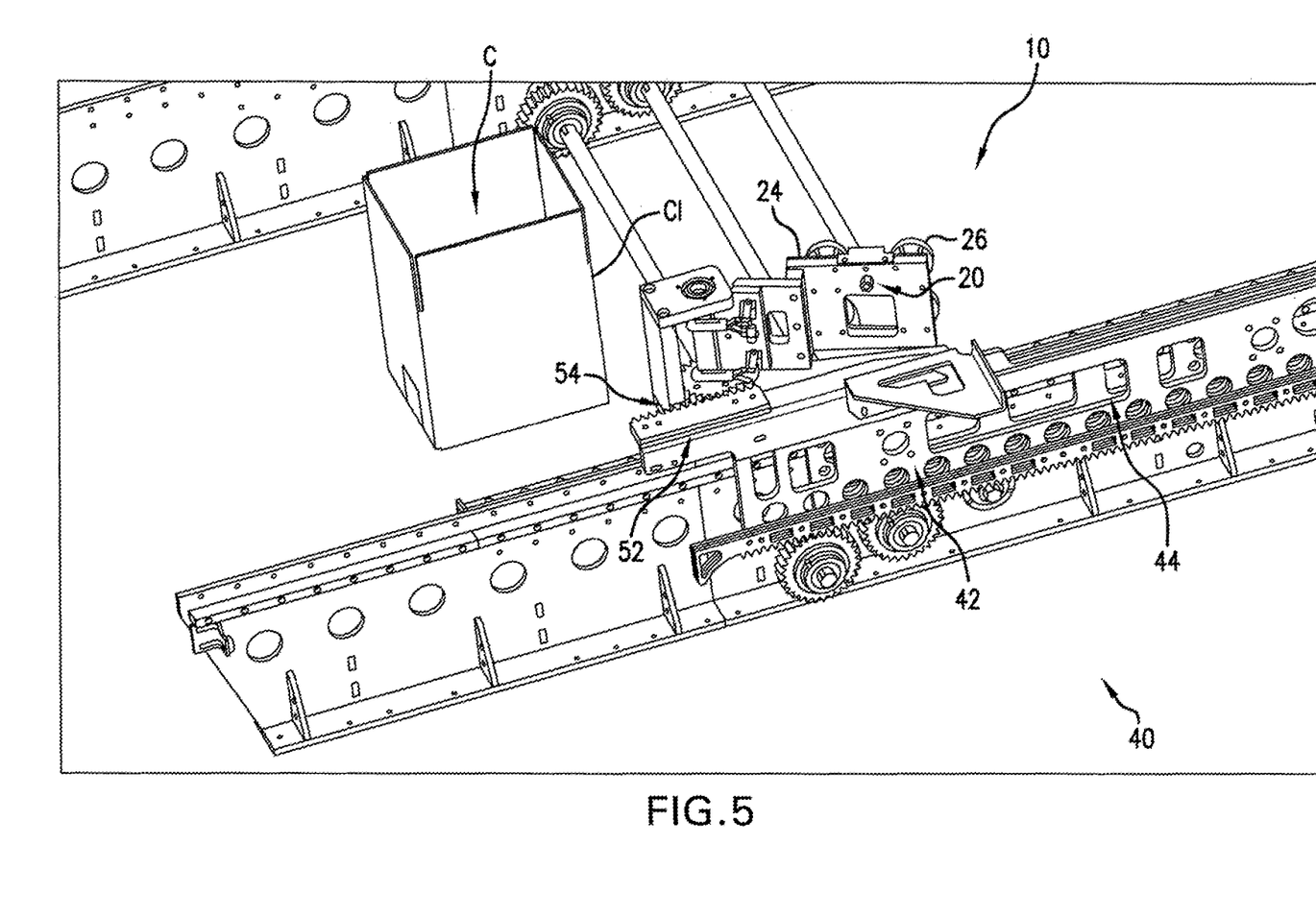
FIG. 5 is a schematic perspective view of the apparatus shown in FIG. 1 in the transport of an exemplary case in accordance with another aspect of the invention.
Figure 6:
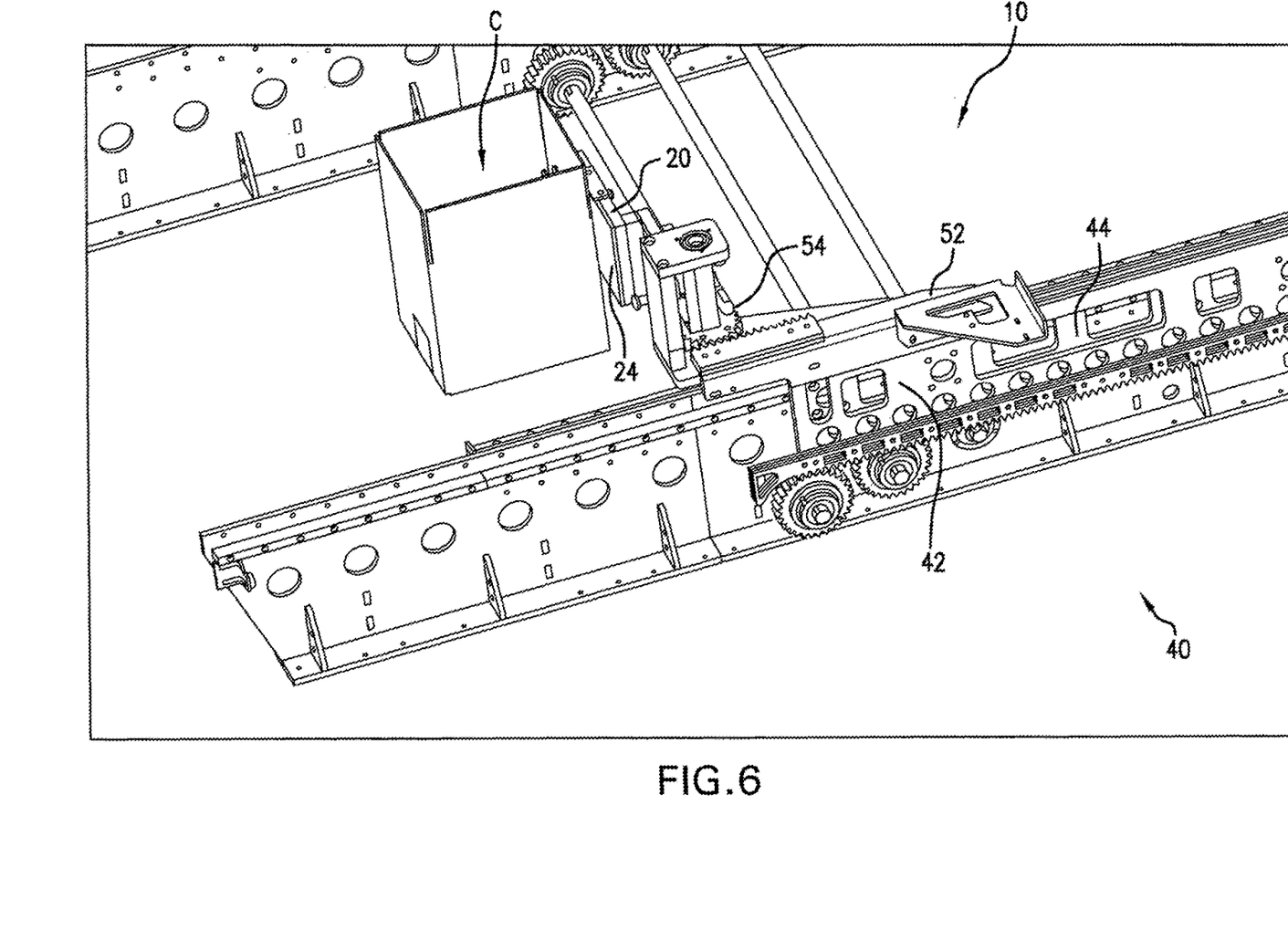
FIG. 6 is a schematic perspective view of the apparatus shown in FIG. 5 but now showing the case transport at a subsequent point in the transport process.

Turning to FIGS. 5 and 6, there is illustrated an embodiment of the apparatus 10 of the subject development as used or applied to transport a case C or box in the transport direction without turning or rotating the box.

In such embodiment, the engagement plate 20 desirably positively engages with an outer surface face of the case C, such as case outer surface back side lateral face C1, with the vacuum suction cups 26. In this embodiment, rather than rotating the engagement plate a desired or selected angle relative to the transport direction, the apparatus is employed to further transport of the case in the transport direction, such as may be desired in some applications such as where the case is being transferred to a different conveyor, for example.

More specifically, FIG. 5 shows the apparatus 10 at a pick up position for a non-turned case embodiment. FIG. 6 illustrates the subsequent attachment by the engagement plate 20 to the case C back lateral side.

While the above described embodiments discuss and describe the transport of an individual case or carton, it is to be understood and appreciated that the subject development can be readily applied and practiced for processing a stream of cases such as for sequentially individually transporting a case along a conveyor moving in a transport direction from a stream of cases in a sequential process.

Further, while the subject development has been described above making specific reference to apparatus embodiments, those skilled in the art and guided by the teaching herein provided will understand and appreciate that the subject development also encompasses corresponding or related methods. In one embodiment, such a method for transporting a case along a conveyor moving in a transport direction involves:

vacuum attaching an engagement plate with a case outer surface face to form a case/plate combination;

moving the combination in the transport direction; and detaching the engagement plate from the case to allow the case to be separately conveyed.

In accordance with particular embodiments, methods for transporting a case along a conveyor moving in a transport direction may suitably involve rotating the case/plate combination prior to the detachment step. Such rotating may involve rotating the case/plate combination selected angle, such as between 0 degrees and 120 degrees and in some cases approximately 90 degrees, relative to the transport direction prior to said detachment step.

The apparatus and methods in accordance with a preferred embodiment of the subject invention rely on positive engagement such as resulting from a vacuum plate with suction cups. As will be appreciated by those skilled in the art and guided by the teaching herein provided, such vacuum plates can desirably be lightweight and compact construction such as to simplify or facilitate storage as well as replacement or substitution. Furthermore, the compatibility of such engagement plates with boxes or cases of different sizes or dimensions may reduce and, in some cases, avoid the need to change tooling dependent on box size.

The subject development provides a unique system and method for positively transporting a case, carton or the like and such as in an empty state or condition in either a turned (e.g., 90 degrees) or non-turned (e.g., inline) orientation. Such systems and methods, in accordance with a preferred embodiment, do not rely on the varying friction factor between the case and conveyor but rather relies on suction cups or the like to adhere to the side or rear of the case to control it during transfer from one station to the next as such control of the case is important to help ensure machine reliability and to prevent jams.

An attractive feature of a system of the subject development in accordance with one preferred embodiment is that the system can, in a small area, provide a unique capability to:

1. transport a case in an inline fashion, such as from a glue compression station to the next indexing station, for example, and 2. turn a case a selected or desired angle, e.g., 90 degrees, such from the orientation of the case upon formation or erection and transport the turned cased to the indexing station.

Those skilled in the art and guided by the teachings herein provided will understand and appreciate that the case transport apparatus and methods of the invention, such as through the application and use of a quick-change vacuum engagement plate, desirably provide a solution to case transport challenges that is either or both lightweight and compact such as to simplify and ease storage. Furthermore, through practice of the invention the need for changes in tooling, such as dependent on case or box size, may desirably be avoided.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. An apparatus for transporting a case along a conveyor moving in a transport direction, the apparatus comprising:
   an engagement plate for positive engagement with a back lateral side of the case, the engagement plate having a planar face and a vacuum source for vacuum attachment to the back lateral side case outer surface face; and
   a mechanism for:
      a. moving the plate in the transport direction, and
      b. rotating the plate a selected angle from the transport direction.

2. The apparatus of claim 1 wherein the planar face of the engagement plate comprises a plurality of vacuum suction cups.

3. The apparatus of claim 1 wherein the mechanism for moving the plate in the transport direction and rotating the plate a selected angle from the transport direction is for rotating the plate an angle of between 0 degrees and 120 degrees from the transport direction.

4. The apparatus of claim 1 wherein the mechanism for moving the plate in the transport direction and rotating the plate a selected angle from the transport direction is for rotating the plate an angle of approximately 90 degrees from the transport direction.

5. The apparatus of claim 1 wherein the mechanism moves the plate inline in the transport direction.

6. A case transport apparatus for sequentially individually transporting a case along a conveyor moving in a transport direction from a stream of cases in a sequential process, the apparatus comprising:
   an engagement plate for positive engagement with the case back lateral side, the engagement plate having a planar face and a vacuum source for vacuum attachment to a back lateral side outer surface face of the case, the engagement plate having a plurality of vacuum suction cups disposed in spaced relation on the planar face to engage with the back lateral side outer surface face of the case; and
   a mechanism for:
      a. moving the plate in the transport direction, and
      b. rotating the plate an angle of between 0 degrees and 120 degrees from the transport direction.

7. The apparatus of claim 6 wherein the mechanism for moving the plate in the transport direction and rotating the plate an angle of between 0 degrees and 120 degrees from the transport direction is for rotating the plate an angle of approximately 90 degrees from the transport direction.

8. The apparatus of claim 6 wherein the mechanism moves the plate inline in the transport direction.

9. A method for transporting a case along a conveyor moving in a transport direction, the method comprising:
vacuum attaching an engagement plate with a case back lateral side outer surface face to form a case/plate combination;
moving the combination in the transport direction; and
detaching the engagement plate from the case to allow the case to be separately conveyed.

10. The method of claim 9 additionally comprising:
rotating the case/plate combination prior to said detachment step.

11. The method of claim 10 wherein the case/plate combination is rotated a selected angle relative to the transport direction prior to said detachment step.

12. The method of claim 10 wherein the case/plate combination is rotated a selected angle between 0 degrees and 120 degrees relative to the transport direction prior to said detachment step.

13. The method of claim 10 wherein the case/plate combination is rotated approximately 90 degrees relative to the transport direction prior to said detachment step.

14. An apparatus for transporting a case along a conveyor moving in a transport direction, the apparatus comprising:
a single engagement plate for positive engagement with the case, the engagement plate having a planar face and a vacuum source for vacuum attachment to a case outer surface face; and
a mechanism for:
   a. moving the plate in the transport direction, and
   b. rotating the plate a selected angle from the transport direction.

15. The apparatus of claim 14 wherein the engagement plate positively engages with a lateral side of the case.

16. The apparatus of claim 14 wherein the planar face of the engagement plate comprises a plurality of vacuum suction cups.

17. The apparatus of claim 14 wherein the mechanism for moving the plate in the transport direction and rotating the plate a selected angle from the transport direction is for rotating the plate an angle of between 0 degrees and 120 degrees from the transport direction.

18. The apparatus of claim 14 wherein the mechanism for moving the plate in the transport direction and rotating the plate a selected angle from the transport direction is for rotating the plate an angle of approximately 90 degrees from the transport direction.

19. The apparatus of claim 14 wherein the engagement plate positively engages with a back lateral side of the case.

20. The apparatus of claim 14 wherein the mechanism moves the plate inline in the transport direction.

* * * * *